(12) United States Patent
Joerg et al.

(10) Patent No.: US 9,893,334 B2
(45) Date of Patent: Feb. 13, 2018

(54) FRAME DEVICE FOR ACCOMMODATING STORAGE CELLS OF AN ENERGY STORAGE MODULE

(71) Applicant: Robert Bosch GmbH, Stuttgart (DE)

(72) Inventors: Nicolai Joerg, Stuttgart (DE); Dirk Liepold, Fellbach (DE); Jochen Schweinbenz, Stuttgart (DE); Jonas Schuetz, Stuttgart-Bad Cannstatt (DE); Kushtrim Krasniqi, Stuttgart (DE); Lukasz Paczkowski, Stuttgart (DE); Markus Kohlberger, Stuttgart (DE); Steffen Benz, Stuttgart (DE); Ulrich Lange, Aichtal (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/501,902

(22) PCT Filed: Jul. 30, 2015

(86) PCT No.: PCT/EP2015/067450
§ 371 (c)(1),
(2) Date: Feb. 6, 2017

(87) PCT Pub. No.: WO2016/020245
PCT Pub. Date: Feb. 11, 2016

(65) Prior Publication Data
US 2017/0237050 A1    Aug. 17, 2017

(30) Foreign Application Priority Data

Aug. 6, 2014   (DE) .................. 10 2014 215 543

(51) Int. Cl.
*H01M 2/10*         (2006.01)
*H01M 10/6554*   (2014.01)
(Continued)

(52) U.S. Cl.
CPC ....... *H01M 2/1077* (2013.01); *H01M 10/613* (2015.04); *H01M 10/625* (2015.04); *H01M 10/6554* (2015.04); *H01M 2220/20* (2013.01)

(58) Field of Classification Search
CPC .................................................. H01M 2/1061
See application file for complete search history.

(56) References Cited

U.S. PATENT DOCUMENTS 5,414,596 A * 5/1995 Eaton .................. H01M 2/1005
                                                                    361/814
8,415,047 B2   4/2013 Park et al.
(Continued)

FOREIGN PATENT DOCUMENTS

DE    102008059961    6/2010
WO    2014024431       2/2014

OTHER PUBLICATIONS

International Search Report for Application No. PCT/EP2015/067450 dated Oct. 9, 2015 (English Translation, 2 pages).

*Primary Examiner* — Olatunji Godo
(74) *Attorney, Agent, or Firm* — Michael Best & Friedrich LLP

(57) ABSTRACT

The invention relates to a frame device (18) for accommodating storage cells (12) of an energy storage module (10), in particular a battery module, comprising—two plate-like closure elements (20) which form two ends (22, 24) of the frame device (18) that are opposite one another along an axis (14), —connection elements (30) which are arranged on mutually opposite sides (26, 28) of the frame device (18) and which extend from one end (22) to the other end (24) of the frame device (18) and mechanically connect the two closure elements (20) over a distance. For connection to the two closure elements (20), provision is made for each of the connection elements (30) to be provided at each of the ends thereof with a pin (42) which is oriented transversely to the (Continued)

axis (14) and which respectively engages in a cutout (40) in one of the closure elements (20) and is releasably fixed there by means of a respective latch-type securing element (32). The invention further relates to a corresponding energy storage module (10).

17 Claims, 7 Drawing Sheets

(51) Int. Cl.
*H01M 10/613* (2014.01)
*H01M 10/625* (2014.01)

(56) References Cited

U.S. PATENT DOCUMENTS

| | | |
|---|---|---|
| 8,450,027 B2 | 5/2013 | Kim et al. |
| 2011/0129713 A1* | 6/2011 | Liang ............... H01M 2/1066 429/97 |
| 2011/0200859 A1* | 8/2011 | Allen ............... H04M 1/0235 429/100 |
| 2013/0183571 A1 | 7/2013 | Miyazaki et al. |
| 2013/0288105 A1 | 10/2013 | Niedzwiecki et al. |

\* cited by examiner

FRAME DEVICE FOR ACCOMMODATING STORAGE CELLS OF AN ENERGY STORAGE MODULE

BACKGROUND OF THE INVENTION

The invention relates to a frame device for accommodating storage cells of an energy storage module, in particular a battery module, comprising (i) two plate-like closure elements which form two ends of the frame device that are opposite one another along an axis and (ii) connection elements which are arranged on mutually opposite sides of the frame device and which extend from one end to the other end of the frame device and mechanically connect the two closure elements over a distance.

Such a frame device and such an electric energy storage module are, for example, known from the U.S. Pat. No. 8,415,047 B2. This features an electric energy storage module designed as a battery module and comprising a stack of prismatic flat battery cells in a frame device that are electrically connected to one another. The frame device has two closure plates which form two ends of the frame device that are opposite one another along an axis. The frame device further comprises connection elements which are arranged on mutually opposite sides of the frame device and which extend from one end to the other end of the frame device and mechanically connect the two closure elements across the stack height of the flat battery stack. To this end, the ends of each of the connection elements are screwed to the one closure plate as well as the other closure plate by means of a screw connection.

Although battery modules (accumulator modules) are the most widely used energy storage modules for storing electric energy, the term energy storage modules also includes aside from these purely electrochemical energy stores electrostatic energy stores (for example capacitors) and hybrid stores comprising a combination consisting of electrochemical and electrostatic energy storage.

The storage cells of a battery or respectively a battery module are the battery cells thereof. A battery cell, for example a lithium cell, typically has battery voltages between 2.5 and 5 volts. Higher voltages are, however, required for the operation of vehicles having electric or hybrid drives. In the case of high voltage battery systems of vehicles, individual battery cells are therefore combined and connected in series to form modules in order to achieve a voltage level that is suitable for the drive concept. Prismatic, for example cuboid, lithium cells tend to form a cell belly depending on the state of charge, the temperature and the cell age. In the case of battery cells, in particular in the case of adjacently arranged battery cells of a battery module, this leads to a length expansion which requires a larger installation space. The performance and the service life of the battery cells are also negatively impacted by the formation of the cell belly. In order to make battery cells more compact, i.e. in order to prevent a length expansion due to the cell bellies, it is known to provide battery modules with a frame.

The German patent specification DE 10 2008 059 961 A1 and the American patent specification US 2013/0288105 A1 feature additional battery modules comprising battery cells and a frame device which surrounds the battery cells. In so doing, the elements of the frame device are attached to one another by different means.

SUMMARY OF THE INVENTION

The frame device according to the invention has the advantage of a simple construction and ease of installation.

In the case of the frame device according to the invention, provision is made for each of the connection elements to be provided at each of the ends thereof with a pin which is oriented transversely to the axis and which respectively engages in a cutout in one of the closure elements and is releasably fixed there by means of a respective latch-type securing element. The cutouts are bore-like holes in the closure elements, which preferably extend in the plate plane of the plate-like closure elements.

In addition to the advantages already mentioned, the following useful features arise: (a) not a single screw is required, (b) the installation steps are simplified because no tools are required for installation and (c) the deinstallation is also relatively simple, wherein the elements of the frame device can be recycled.

All or at least some of the elements of the frame device are preferably made from plastic. As a result, the weight of the frame device is significantly reduced with respect to a frame device consisting of metal elements, such as metal elements obtained by continuous casting.

According to an advantageous configuration of the invention, the latch-type securing elements are either designed as latching elements formed on the pins or as separate securing elements that can be introduced into the closure elements from the outside. The latching elements formed on the pins are for example detent lugs, by means of which the pins automatically lock (clip) into the cutouts when being inserted. A channel is preferably provided in the closure element in order to release this detent connection. A corresponding tool is inserted through the channel and up to the latching element in order to unlock the same. The separate securing elements are particularly designed as securing rings, securing pins and/or securing clamps. These are transversely mounted to the longitudinal direction of the corresponding pin and block the pin from pulling out of the corresponding cutout.

According to another advantageous embodiment of the invention, provision is made for respectively two connection elements to be provided on each of the two mutually opposite sides, the pins of which extend in the closure elements so as to be oriented in a mutually opposite direction.

According to an advantageous modification to the invention, each of the connection elements has an L-shaped cross section and forms an edge of the frame device. The connection elements thereby form a clamp construction, in which the battery cells are held in a clamping manner.

According to an advantageous configuration of the invention, a connection part is disposed between at least two of the connection elements and extends from the one to the other of the two connection elements.

According to a further advantageous configuration of the invention, each of the closure elements has openings for the insertion of connection pins. By means of these connection pins that are inserted with an end section into the openings and a coupling module which has on both sides corresponding openings for accommodating the respectively other end section of the connection pins, energy storage modules are enabled to be coupled to one another in a serial mechanical manner.

The frame device advantageously comprises a heat transport plate on at least one side, said heat transport plate preferably extending across the complete axial region of the frame, which axial region is provided for the cells.

The invention further relates to an electric energy storage module, in particular a battery module, comprising a plurality of storage cells that are electrically connected to one another and a frame device, which surrounds the storage cells and is designed as a frame device mentioned above.

According to an advantageous configuration of the energy storage module according to the invention, the storage cells of the module are designed as prismatic storage cells.

According to an advantageous modification to the invention, the storage cells are stacked to form a storage cell stack between the closure elements of the frame device along the axis. The corresponding storage cell stack of the module is clamped between the two closure elements.

According to a further advantageous configuration of the energy storage module according to the invention, compressible intermediate elements and/or fire-resistant polymer plates are disposed between the storage cells. In one embodiment, compressible intermediate elements are also furthermore disposed between the connection elements and the storage elements.

BRIEF DESCRIPTION OF THE DRAWINGS

The invention is explained below in detail using diagrams. In the drawings.

DETAILED DESCRIPTION

Figure 1:
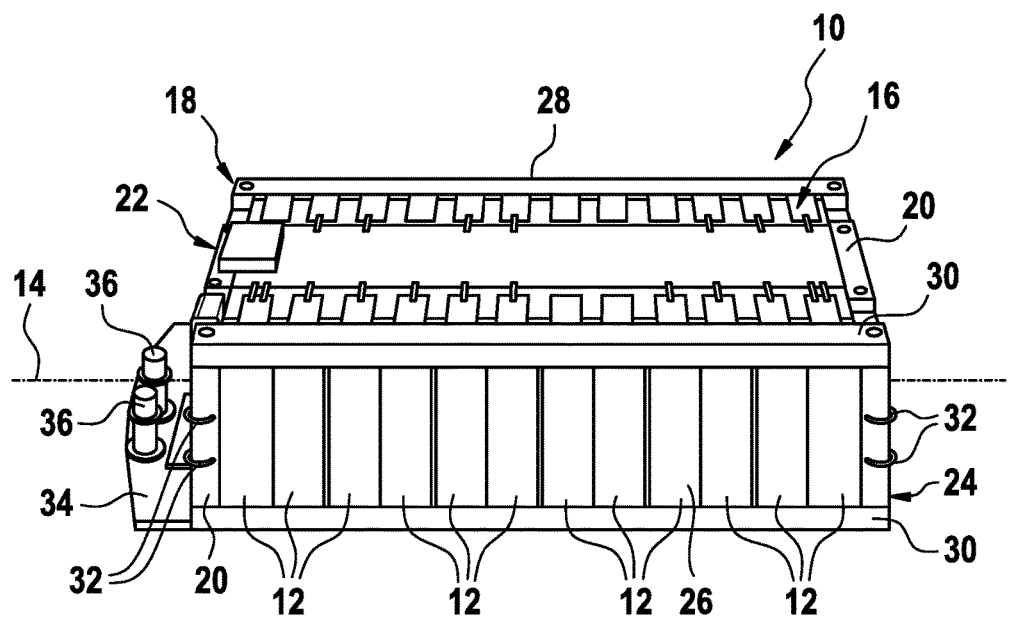
FIG. 1 shows an electric storage module comprising storage cells and a frame device according to a preferred configuration of the invention.

FIG. 1 features an electric energy storage module 10 designed as a battery module. This electric energy storage module 10 comprises (in the example twelve) storage cells 12 which are designed as rechargeable battery cells (accumulator cells) and which are electrically connected to one another. The storage cells 12 are designed as prismatic storage cells, more precisely as flat, cuboid storage cells 12, which are disposed one behind the other and form a stack 16. This cell stack 16 is surrounded by a frame device 18 of the energy storage module 10. The frame device 18 has a plate-like closure element 20 at each of the two ends of the stack 16. These two closure elements 20 form the ends of the frame device 18 that are mutually opposite one another along the axis 14. The frame device 18 further has respectively two connection elements 30 on two mutually opposite sides 26, 28 thereof, which extend from the one end 22 to the other end 24 of the frame device 18 and as a result mechanically connect the two closure elements 20 over a distance. In FIG. 1, respectively two separate securing elements 32, the function of which is explained during the course of the further figure description, can be seen at the edges of the closure elements 20. Finally, the frame device 18 shown in FIG. 1 comprises another base plate designed as a heat transport plate. A fluid channel (not shown) is located in the heat transport plate 34, from which fluid channel only the fluid connections 36 at the end 22 of the frame device 18 can be seen.

Figure 2:
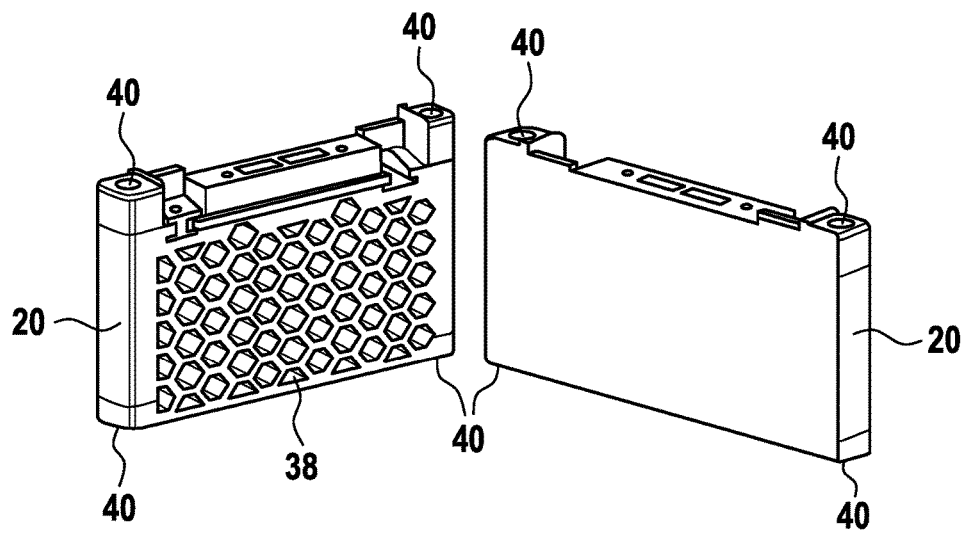
FIG. 2 shows a closure element of the frame device shown in FIG. 1.

FIG. 2 shows a closure element 20 of the frame device 18, the one side of the closure element 20 being shown on the left side of FIG. 2 and the other side of said closure element 20 being shown on the right side of FIG. 2. The plate-like closure element 20 has a honeycombed structure 38 on the one side thereof, whereas there is a smooth surface on the other side thereof. Alternatively to the honeycombed structure 38, the closure element 20 can however also be differently structured. The structured side is used as the outer side of the frame device. On the narrow top and bottom side of the plate-like closure element 20, a bore-like cutout 40 is located at each end for respectively one of the pins of the connection elements 30 show in FIG. 3.

Figure 3:
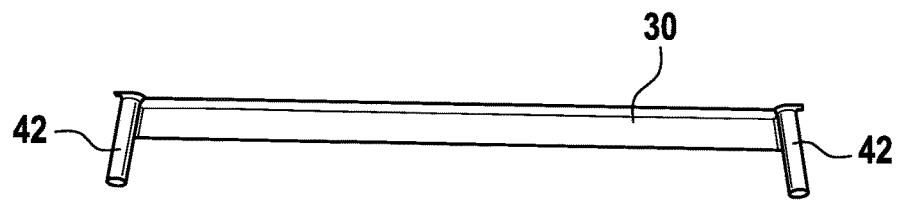
FIG. 3 shows a connection element of the frame device shown in FIG. 1.

FIG. 3 shows one of the corresponding connection elements 30. Each of the connection elements 30 has a pin which is oriented transversely to the longitudinal axis thereof at each of the ends thereof in order to connect to the two closure elements 20. The connection element 30 can engage by means of the pin 42 in one of the channel-like cutouts 40 in order to connect to the respective closure element 20.

In order to now fix the connection between respective closure element 20 and connection element 30, said latch-type securing element 32 is provided, which prevents the pin 42 inserted in the cutout 40 from pulling out of said cutout 40 by means of a latching structure acting transversely to the orientation of the pin 42. In so doing, the latch-type securing elements 32, for example—as shown in FIG. 1—can be separate securing elements 44 that are introduced from the outside into the closure element 20. The connection element 30 has an L-shaped cross section at least in a center portion between the two pins 42 in order to form an edge of the frame device 18.

Figure 4:
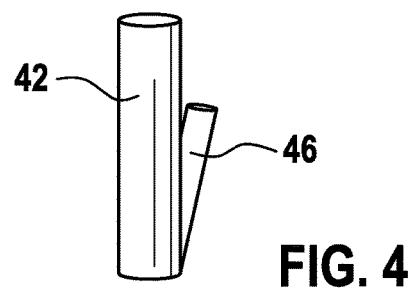
FIG. 4 shows a pin comprising a securing device of a connection element.

In FIG. 4, an alternative configuration of the securing element 32 is shown. This securing element 32 is a latching element 46 designed on the pin 42, which latching element engages behind a holding structure (not shown) in the cutout 40 or at least braces the pin 42 in the cutout 40 via spring forces.

FIGS. 5 to 15 show further aspects of the energy storage module 10 as well as the frame device 18 thereof, so that primarily differences of the individual embodiments are presented below.

Figure 5:
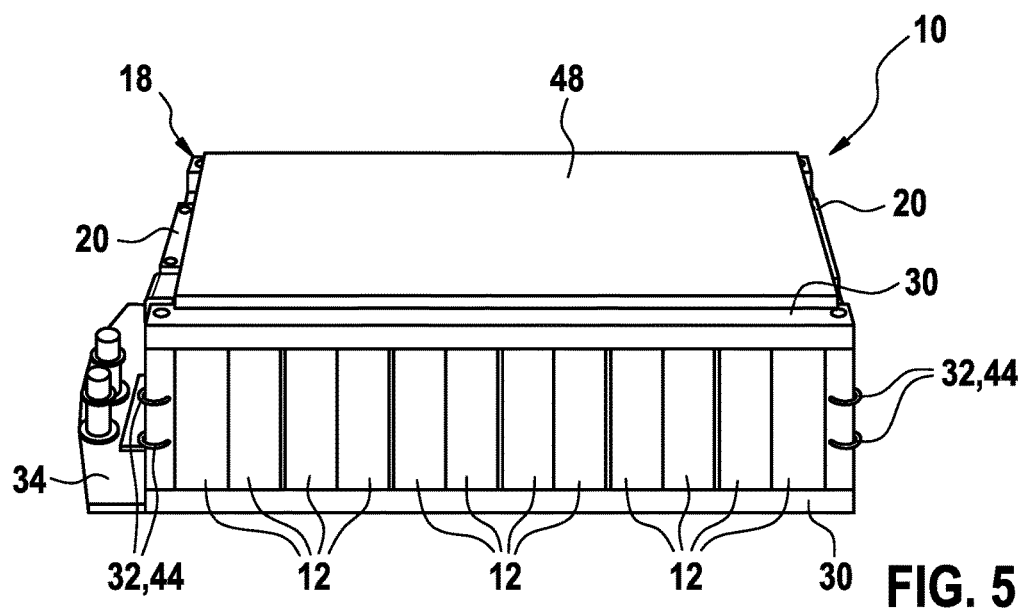
FIG. 5 shows a further depiction of the energy storage module.
Figure 6:
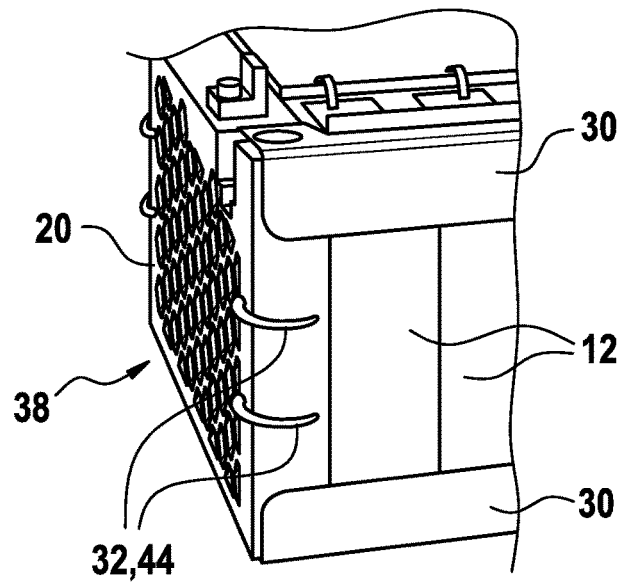
FIG. 6 shows a detailed depiction of the energy storage module.

FIG. 5 shows an electric energy storage module 10 which substantially corresponds to that of FIG. 1. FIG. 5 shows the cell stack consisting of a plurality of storage cells 12 which is surrounded by the frame device 18. In addition to the closure elements 20, the connection elements 30 and the heat transport plate 34 designed as a base plate, the frame device 18 of FIG. 5 further comprises a cover 48 which covers the contacts of the cells 12 as well as a module controller.

FIG. 6 shows once again in detail the connection between the plate-like closure element 20 and the connection elements 30 that engage around the edges of the cells 12 in a clamping manner by means of the separate securing elements 44.

Figure 7:
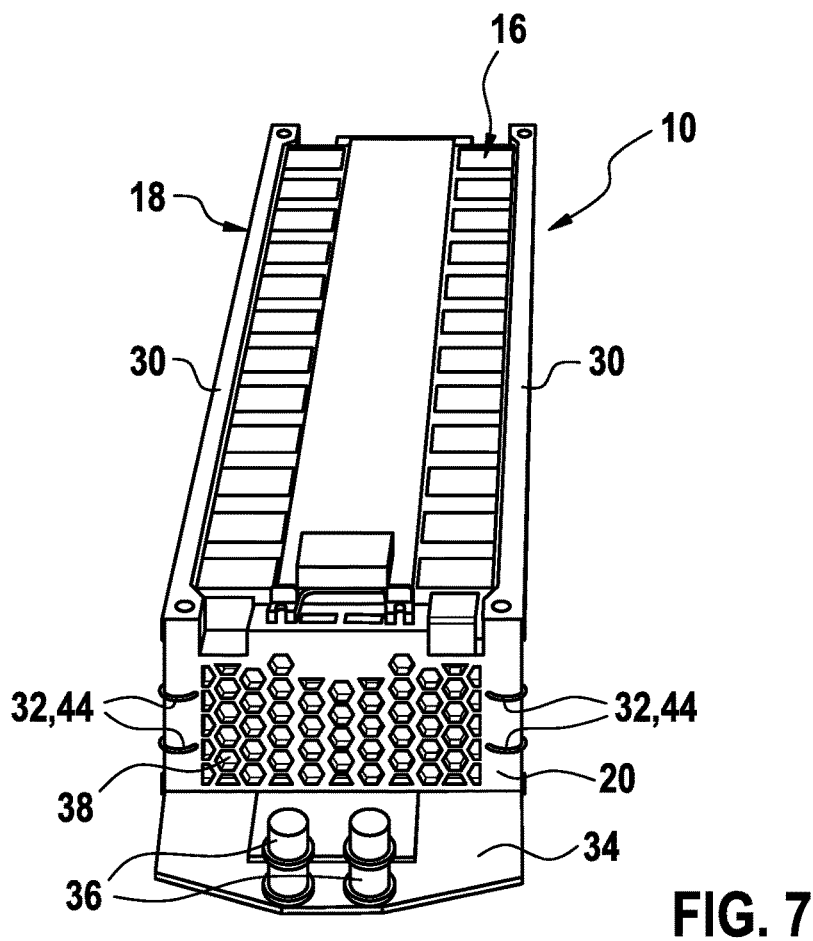
FIG. 7 shows a further depiction of the energy storage module.

In FIG. 7, the energy storage module 10 is shown once again from another perspective. In this case—as also already the case in FIG. 6—the structured side of the closure element 20 which faces towards the outside can be easily recognized by means of the structure 38 (honeycomb structure).

Figure 8:
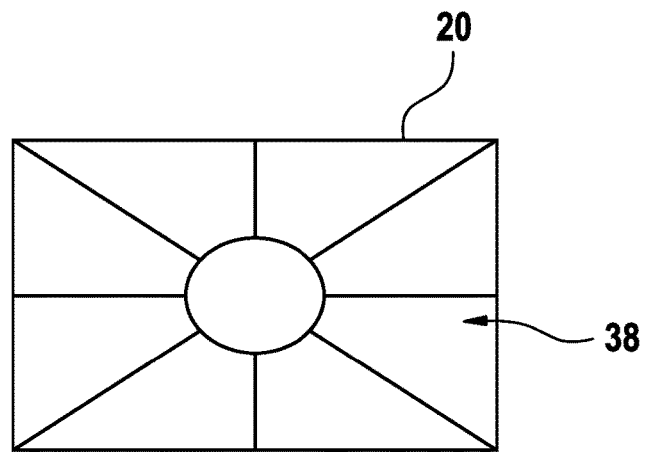
FIG. 8 shows an alternative configuration of the closure elements.

FIG. 8 shows an alternative configuration of the structure of the structured side of a closure element. In the case of this structure, eight ribs run radially towards a central point. Expansion forces occurring as a result of the operation of the cells 12 can be particularly well compensated by means of this structure.

Figure 9:
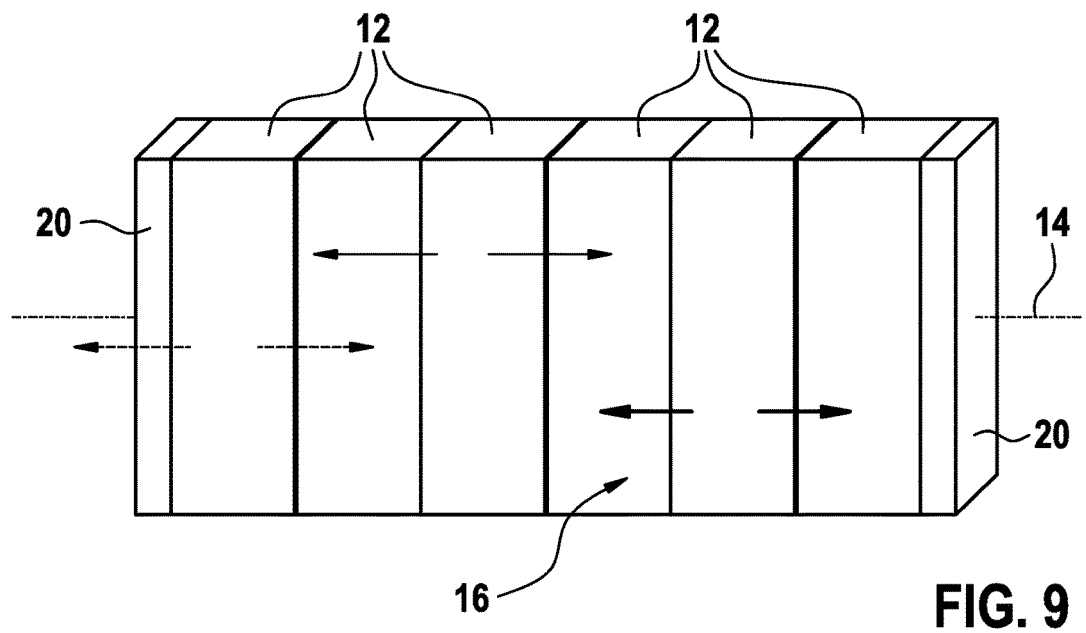
FIG. 9 shows a schematic depiction of the module and the forces occurring during operation.

The corresponding forces are diagrammed in the schematic depiction of FIG. 9. This depiction shows the cell stack 16 of the storage cells stacked along the axis 14 as well as the closure elements designed as connection plates at the mutually opposite ends 22, 24 of the frame device 18.

Figure 10:
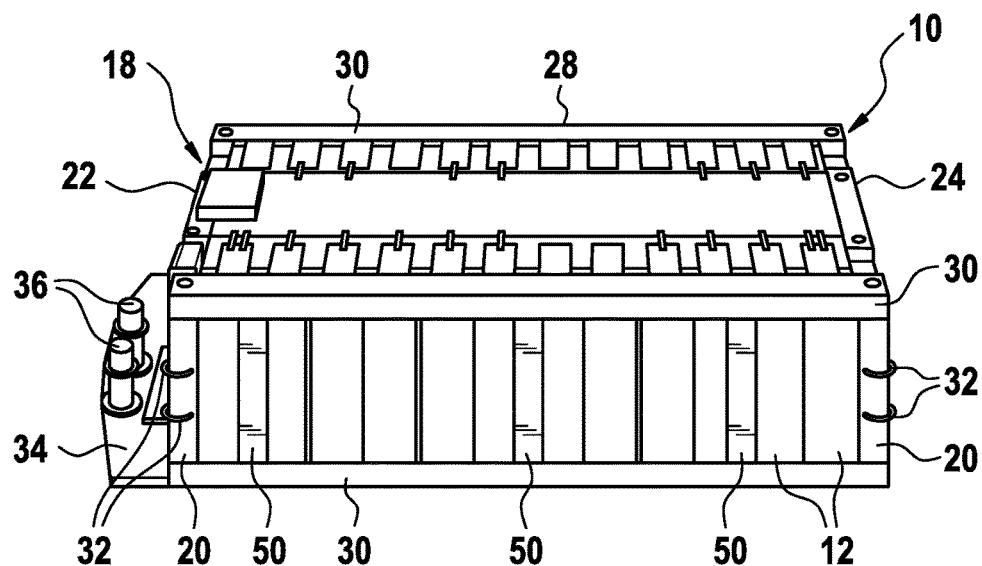
FIG. 10 shows still another depiction of the energy storage module.

Optional connection parts 50 for connecting the connection elements 30 of one side 26, 28 of the frame device 18 are shown in FIG. 10. The connection parts 50 are disposed between the two connection elements 30 and extend from one to the other of the two connection elements 30. As a result, a higher degree of stability occurs in the direction between the two connection elements 50.

Figure 11:
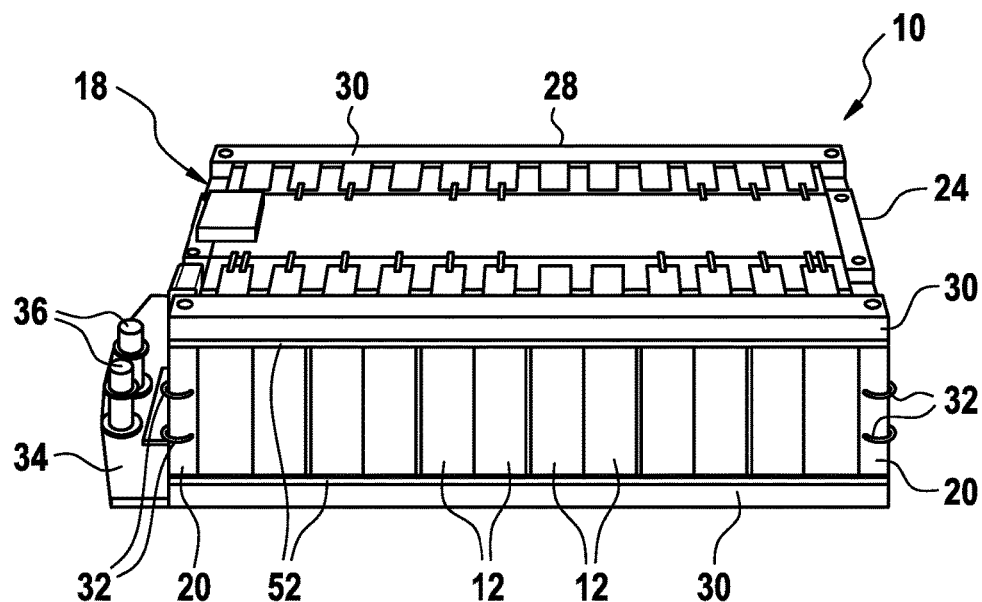
FIG. 11 shows a further depiction of the energy storage module.

Additional structural stability in all directions can be achieved by additional compressible intermediate elements, for example intermediate layers. FIG. 11 shows an energy storage module comprising corresponding intermediate elements 52. These compressible intermediate elements 52 made from elastic material are disposed between the individual storage cells 12 and/or between the connection elements 30 and the storage cells 12. The intermediate elements 52 preferably consist of compressible and/or fire-resistant material, such as, for example, polymer materials (e.g. aramid). The intermediate elements 52 disposed between the storage cells 12 and the connection elements 30 eliminate the structural differences between the connection elements 30 acting as clamps and the storage cells 12. Alternatively or additionally, the intermediate elements 52 are electrically as well as thermally insulating.

Figure 12:
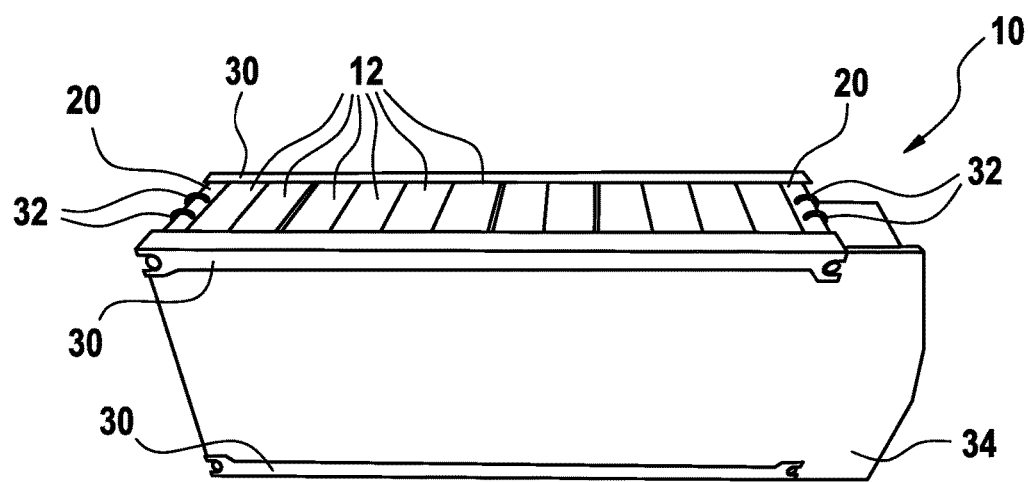
FIG. 12 shows a depiction of the energy storage module from another perspective.

FIG. 12 shows the bottom side of the energy storage module 10 comprising the heat transport plate 34 designed as a base plate. Electrically insulating elements are typically disposed between the storage cells 12 and the heat transport plate 34. The storage cells are often coated on all sides with a (colored) lacquer or a polymer layer. Alternatively, the cells 12 are packed in polymer bags. The storage cells 12 are disposed on the top side of the heat transport plate 34 designed as a base plate of the energy storage module 10. An electrical insulation is optionally disposed between the plate 34 and the storage cells 12.

Figure 13:
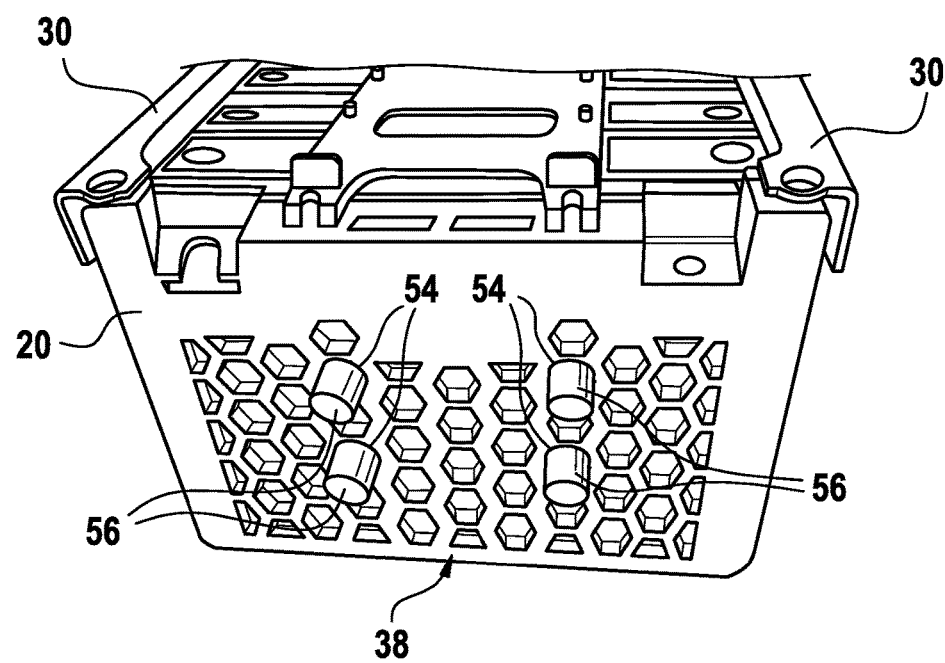
FIG. 13 shows a depiction of the energy storage module comprising a view onto one of the closure elements.

FIG. 13 shows a depiction of the one end 22 of the energy storage module 10 with a view onto one of the closure elements 20. The closure element 20 has the honeycomb structure 38 that was already shown in FIG. 2, wherein this structure forms openings 54 for inserting connection pins 56. In the example of FIG. 13, four such connection pins 56 are inserted into the openings 54 formed by the honeycomb structure 38.

Figure 14:
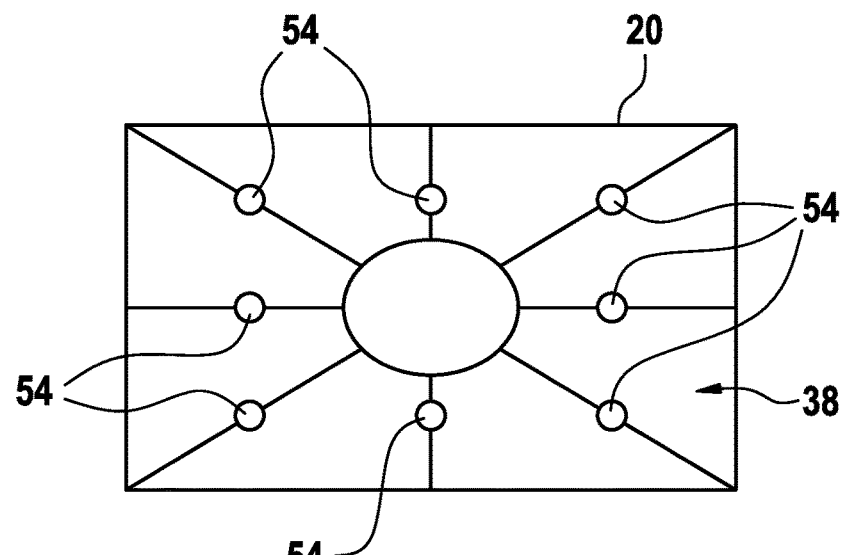
FIG. 14 shows the positions of openings in the alternative configuration of the closure elements shown in FIG. 8.

In FIG. 14, the positions of the openings 54 in the alternative configuration of the closure elements 20 shown in FIG. 8 are shown. Provision is thereby made for eight openings 54, which are positioned in each case on one of the ribs and which are disposed in the shape of a rectangle.

Figure 15:
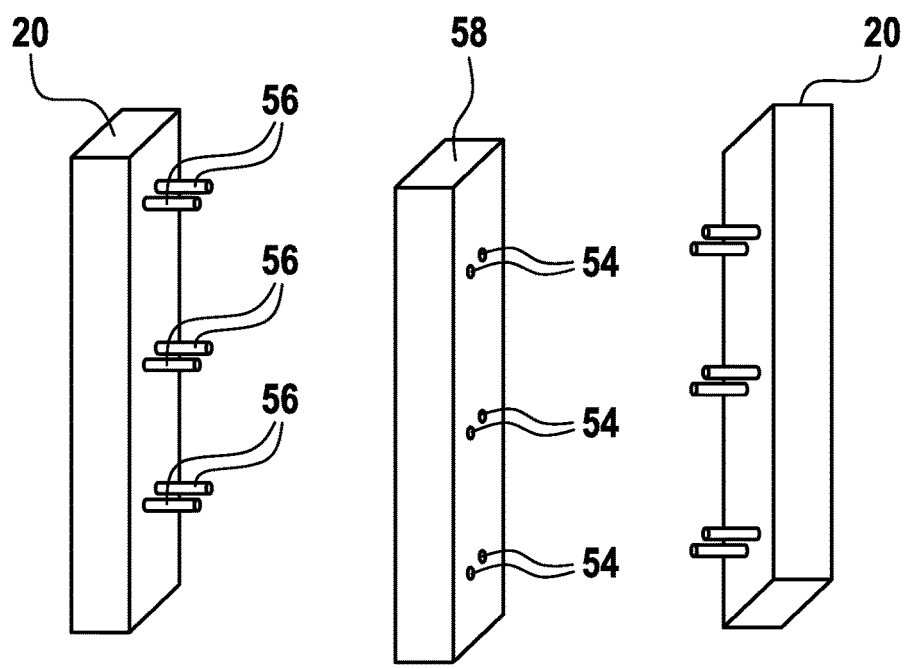
FIG. 15 shows two closure elements of different modules and the mechanical coupling thereof via a coupling element.

FIG. 15 shows in a schematic depiction two closure elements 20 of different energy storage modules 10 and the mechanical coupling thereof via a coupling module 58. Each of the closure elements 20 has openings 54 for inserting connection pins 56 via the structure 38. A serial mechanical linking up of energy storage modules is enabled by means of these connection pins, an end section of which is inserted into the openings 54, and the coupling module 58, which has corresponding openings 54 on both sides for accommodating the respective other end section of the connection pins 56.

What is claimed is:

1. A frame device (18) for accommodating storage cells (12) of an energy storage module (10), comprising
    two plate-like closure elements (20) which form two ends (22, 24) of the frame device (18) that are opposite one another along an axis (14), and
    connection elements (30) which are arranged on mutually opposite sides (26, 28) of the frame device (18) and which extend from one end (22) to an other end (24) of the frame device (18) and mechanically connect the two closure elements (20) over a distance; characterized in that for connection to the two closure elements (20), each of the connection elements (30) has a pin (42) which is oriented transversely to the axis (14) and which respectively engages in a cutout (40) in one of the closure elements (20) and is releasably fixed there by means of a respective latch-type securing element (32).

2. The frame device according to claim 1, characterized in that the latch-type securing elements (32) are separate securing elements (44) that can be introduced into the closure elements (20) from the outside.

3. The frame device according to claim 2, characterized in that the separate securing elements (44) are securing pins, securing brackets or securing rings.

4. The frame device according to claim 1, characterized in that respectively two connection elements (30) are provided on each of the two mutually opposite sides (26, 28), the pins (42) of which extend in the closure elements (20) so as to be oriented in opposite directions to one another.

5. The frame device according to claim 1, characterized in that each of the connection elements (30) has an L-shaped cross section and forms an edge of the frame device (18).

6. The frame device according to claim 1, characterized in that at least one of the closure elements (20) has openings (54) for the insertion of connection pins (56).

7. An electrical energy storage module (10), comprising a plurality of storage cells (12) that are electrically connected to one another and a frame device (18) that surrounds the storage cells (12), characterized in that said frame device (18) includes two plate-like closure elements (20) which form two ends (22, 24) of the frame device (18) that are opposite one another along an axis (14), and connection elements (30) which are arranged on mutually opposite sides (26, 28) of the frame device (18) and which extend from one end (22) to an other end (24) of the frame device (18) and mechanically connect the two closure elements (20) over a distance; characterized in that for connection to the two closure elements (20), each of the connection elements (30) has a pin (42) which is oriented transversely to the axis (14) and which respectively engages in a cutout (40) in one of the closure elements (20) and is releasably fixed there by means of a respective latch-type securing element (32).

8. The energy storage module according to claim 7, characterized in that the storage cells (12) are prismatic storage cells (12).

9. The energy storage module according to claim 7, characterized in that the storage cells (12) are stacked to form a storage cell stack (16) between the closure elements (20) of the frame device (18) along the axis (14).

10. The energy storage module according to claim 7, characterized in that compressible intermediate elements or fire-resistant polymer plates are disposed between the storage cells (12).

11. The energy storage module according to claim 7, characterized in that the latch-type securing elements (32) are separate securing elements (44) that can be introduced into the closure elements (20) from the outside.

12. The energy storage module according to claim 11, characterized in that the separate securing elements (44) are securing pins, securing brackets or securing rings.

13. The energy storage module according to claim 7, characterized in that respectively two connection elements (30) are provided on each of the two mutually opposite sides (26, 28), the pins (42) of which extend in the closure elements (20) so as to be oriented in opposite directions to one another.

14. The energy storage module according to claim 7, characterized in that each of the connection elements (30) has an L-shaped cross section and forms an edge of the frame device (18).

15. The energy storage module according to claim 7, characterized in that at least one of the closure elements (20) has openings (54) for the insertion of connection pins (56).

16. The energy storage module according to claim 7, characterized in that the latch-type securing elements (32) are latching elements (46) formed on the pin (42).

17. The frame device according to claim 1, characterized in that the latch-type securing elements (32) are latching elements (46) formed on the pin (42).

* * * * *